United States Patent
Yamazaki et al.

(10) Patent No.: US 9,178,614 B2
(45) Date of Patent: *Nov. 3, 2015

(54) METHOD FOR ESTIMATING AMOUNT OF WAVELENGTH DISPERSION, WAVELENGTH DISPERSION COMPENSATION CIRCUIT, AND RECEIVING DEVICE

(75) Inventors: Etsushi Yamazaki, Yokosuka (JP); Takayuki Kobayashi, Yokosuka (JP); Masahito Tomizawa, Yokosuka (JP); Riichi Kudo, Yokosuka (JP); Koichi Ishihara, Yokosuka (JP); Tadao Nakagawa, Yokosuka (JP); Mitsuteru Ishikawa, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 13/981,298

(22) PCT Filed: Jan. 24, 2012

(86) PCT No.: PCT/JP2012/051427
§ 371 (c)(1),
(2), (4) Date: Sep. 27, 2013

(87) PCT Pub. No.: WO2012/102264
PCT Pub. Date: Aug. 2, 2012

(65) Prior Publication Data
US 2014/0016929 A1    Jan. 16, 2014

(30) Foreign Application Priority Data

Jan. 24, 2011  (JP) .................................. 2011-011544

(51) Int. Cl.
*H04B 10/08*  (2006.01)
*H04B 10/079*  (2013.01)
*H04B 10/2513*  (2013.01)

(52) U.S. Cl.
CPC ...... *H04B 10/07951* (2013.01); *H04B 10/2513* (2013.01)

(58) Field of Classification Search
USPC ............... 398/29, 81, 147–150, 159, 208
See application file for complete search history.

(56) References Cited

U.S. PATENT DOCUMENTS 6,081,360 A * 6/2000 Ishikawa et al. ............ 398/147
6,204,949 B1 * 3/2001 Ishikawa et al. ............ 398/159
(Continued)

FOREIGN PATENT DOCUMENTS

EP    2 214 333 A1    8/2010
JP    2001-053679 A   2/2001
(Continued)

OTHER PUBLICATIONS

International Preliminary Report Patentability, dated Aug. 8, 2013 from corresponding International Application No. PCT/JP2012/051427, 6 pgs.
(Continued)

*Primary Examiner* — Li Liu
(74) *Attorney, Agent, or Firm* — Ohlandt Greeley Ruggiero & Perle L.L.P.

(57) ABSTRACT

A wavelength dispersion amount estimation method, a wavelength dispersion compensation circuit, and a receiving device which rapidly estimate and set a wavelength dispersion amount to compensate with high accuracy at the receiving device which compensates waveform distortion at an optical fiber transmission path. A wavelength dispersion compensation circuit includes an analog-digital converter which converts an optical analog waveform received from the optical fiber transmission path to a digital signal, a digital signal processor which compensates waveform distortion of the digital signal output from the analog-digital converter due to wavelength dispersion at the optical fiber transmission path with a dispersion compensation amount estimated with the wavelength dispersion amount estimation method, and a symbol clock extractor which extracts a symbol arrival timing clock of received data contained in the digital signal output from the analog-digital converter and outputs strength of the symbol arrival timing clock as the clock detection value.

39 Claims, 8 Drawing Sheets

(56) References Cited

U.S. PATENT DOCUMENTS

| | | | |
|---|---|---|---|
| 6,411,416 B1 * | 6/2002 | Ooi et al. | 398/141 |
| 6,587,242 B1 * | 7/2003 | Shake et al. | 398/98 |
| 6,871,024 B2 * | 3/2005 | Nishimoto et al. | 398/159 |
| 6,987,903 B2 * | 1/2006 | Nakajima et al. | 385/24 |
| 8,045,856 B2 * | 10/2011 | Shen et al. | 398/65 |
| 8,538,265 B2 * | 9/2013 | Kaburagi et al. | 398/81 |
| 2003/0002112 A1 * | 1/2003 | Hirano et al. | 359/161 |
| 2003/0163771 A1 * | 8/2003 | Tomofuji | 714/48 |
| 2004/0213578 A1 * | 10/2004 | Takahara et al. | 398/147 |
| 2007/0047964 A1 * | 3/2007 | Ooi et al. | 398/147 |
| 2007/0177876 A1 * | 8/2007 | Ooi et al. | 398/147 |
| 2008/0187323 A1 * | 8/2008 | Honda et al. | 398/159 |
| 2009/0080902 A1 * | 3/2009 | Noheji et al. | 398/159 |
| 2010/0092185 A1 * | 4/2010 | Nemoto | 398/208 |
| 2010/0196017 A1 | 8/2010 | Tanimura et al. | |
| 2011/0052198 A1 * | 3/2011 | Ohtani | 398/81 |
| 2012/0281981 A1 * | 11/2012 | Le Taillandier De Gabory et al. | 398/29 |

FOREIGN PATENT DOCUMENTS

| | | |
|---|---|---|
| JP | 2009-169518 A | 7/2009 |
| JP | 2010-178222 A | 8/2010 |
| WO | WO 99/48231 | 9/1999 |
| WO | WO 2007/141846 A1 | 12/2007 |
| WO | WO 2009/144997 A1 | 12/2009 |
| WO | WO 2011/007803 A1 | 1/2011 |

OTHER PUBLICATIONS

Masuda, et al.; "13.5-Tb/s (135 ×111-Gb/s/ch) No-Guard-Interval Coherent OFDM Transmission over 6,248 km using SNR Maximized Second-order DRA in the Extended L-Band"; 2009; OSA/OFC/NFOEC; PDPB5; 3 pages.

Yu, et al.; "17 Tb/s (161×114 Gb/s) PolMux-RZ-8PSK transmission over 662 km of ultra-low loss fiber using C-band EDFA amplification and digital coherent detection"; vol. 7-27 to vol. 7-28; ECOC 2008, Sep. 21-25, 2008, Th.3.E.2; Brussels, Belgium; IEEE.

Liu, et al.; "Initial Tap Setup of Constant Modulus Algorithm for Polarization De-multiplexing in Optical Coherent Receivers"; 2009; OSA/OFC/NFOEC 200; 3 pages; OMT2.

International Search Report dated Feb. 21, 2012 (with English Translation) from corresponding PCT/JP2012/051427, 3 pages.

Chinese Office Action dated Aug. 5, 2015 corresponding to Chinese Patent Application No. 2012800114213; 7 pages.

* cited by examiner

METHOD FOR ESTIMATING AMOUNT OF WAVELENGTH DISPERSION, WAVELENGTH DISPERSION COMPENSATION CIRCUIT, AND RECEIVING DEVICE

TECHNICAL FIELD

The present invention, being used for optical communications, relates to a wavelength dispersion amount estimation method, a wavelength dispersion compensation circuit, and a receiving device which compensate waveform distortion due to wavelength dispersion, cross polarization interference, polarization mode dispersion, and the like at an optical fiber transmission path using a digital signal process.

BACKGROUND ART

In the field of optical communications, a communication system combining a synchronous detection method which dramatically improves frequency usage efficiency and signal processing is attracting attention. Compared to a system constructed with direct detection, it is known to be capable of compensating waveform distortion of transmitting signals due to wavelength dispersion and polarization mode dispersion received owing to optical fiber transmission by receiving as digital signals in addition to improving receiving sensitivity. Therefore, introducing as an optical communication technology of the following generation is considered.

A digital coherent method represented by Non-Patent Literatures 1 and 2 adopts a method to compensate quasi-static wavelength dispersion with a fixed digital filter (e.g., a tap number of 2048 taps with a dispersion of 20000 ps/nm against a signal of 28 Gbaud) and to compensate polarization mode dispersion having variation with an adaptive filtering with the small tap number (e.g., about 10 to 12 taps for polarization mode dispersion of 50 ps) using blind algorithm.

CITATION LIST

Patent Literatures

Patent Literature 1: Japanese Patent Application Laid-Open No. 2001-053679
Patent Literature 2: WO/2009/144997
Patent Literature 3: Japanese Patent Application No. 2009-169518
Patent Literature 4: WO/2011/007803

Non-Patent Literature

Non-patent Literature 1: H. Masuda, et. al., "13.5-Tb/s (135×111-Gb/s/ch) No-Guard-Interval Coherent OFDM Transmission over 6,248 km using SNR Maximized Second-order DRA in the Extended L-band," OSA/OFC/NFOEC 2009, PD PB5.

Non-patent Literature 2: Jianjun Yu, et. al., "17 Tb/s (161× 114 Gb/s) PolMux-RZ-8PSK transmission over 662 km of ultra-low loss fiber using C-band EDFA amplification and digital coherent detection,"ECOC 2008, Th. 3. E. 2, Brussels, Belgium, 21-25 Sep. 2008.

Non-patent Literature 3: L. liu, et al., "initial Tap Setup of Constant Modulus Algorithm for Polarization De-multiplexing in Optical Coherent Receivers," OSA/OFC/NFOEC 2009, OMT 2.

SUMMARY OF INVENTION

Technical Problem

In a transmission system, waveform distortion due to wavelength dispersion applied at a transmission path is compensated with digital signal processing of a receiving terminal at the receiving terminal. Here, there are types of transmission fiber such as single mode fiber, dispersion shift fiber, and non-zero dispersion shift fiber and a wavelength dispersion amount which a signal receives at the transmission path differs. Further, since an accumulative wavelength dispersion amount increases in proportion to a length of the transmission path fiber through which signal light transmitted, an accumulative dispersion amount varies due to the transmitting distance. In a case that an optical dispersion compensation instrument is inserted to a repeater of the transmitting system, a residual dispersion amount varies owing to the compensation amount thereof. Further, there are cases that a dispersion compensation fiber is used as a transmitting path for a submarine system and the like. Further, since a wavelength dispersion coefficient varies owing to a carrier wavelength of signal light, accumulative dispersion amount is dependent on a wavelength of the signal light. Owing to the above reasons, a coefficient of a dispersion compensation filter should be controlled in accordance with the accumulative wavelength dispersion amount at the receiving terminal. Therefore, a mechanism to estimate the accumulative wavelength dispersion amount which the signal receives is required.

As a conventional art of detecting an optimum wavelength dispersion compensation amount, a method of using a characteristic that quality of received signal drops which occurs owing to residual wavelength distortion due to wavelength dispersion. For example, residual wavelength distortion due to wavelength dispersion increases an error rate. Accordingly, there is a method to control. a set value for the wavelength dispersion compensation circuit so that the error rate calculated by comparing a known signal pattern and a received pattern becomes small, for example. Further, generally, a synchronous detection signal of a clock extracting-synchronizing circuit becomes small when residual wavelength distortion due to wavelength dispersion exists. There is a method to control the wavelength dispersion compensation amount making use of such characteristics (e.g., see Patent Literature 1). Further, a method using an opening degree of an eye pattern has been proposed (e.g., see Patent Literature 2).

However, according to these methods, when the accumulative wavelength dispersion amount which the received signal has received and the compensating amount at the dispersion compensation amount circuit largely differs, correlation between a compensating residual dispersion amount and variation of a monitor signal becomes extremely small, so that control of the dispersion compensation amount using the monitor signal becomes impossible. Therefore, a process such as to exhaustively vary and to sweep the dispersion compensation amount is required so that correlation between the residual dispersion amount and the monitor signal can be obtained with the residual dispersion amount. Accordingly, there has been a problem that setting time becomes long.

Meanwhile, a method to estimate a wavelength dispersion amount by inserting a known signal to transmitting signal light and using the known signal. part at the receiving terminal from waveform variation of the known signal has been known as a method to rapidly detect the wavelength dispersion amount to compensate (e.g., see Patent Literature 3).

However, although the dispersion estimation method using the known signal is rapid, there is a problem that an error occurs for the estimation amount owing to waveform distortion due to polarization mode dispersion, nonlinear waveform distortion, and the like other than wavelength dispersion.

When an estimated value of wavelength dispersion is set as a compensation amount for the dispersion compensation circuit, waveform distortion due to wavelength dispersion remains even after compensation, so that an error rate increases in cases that an error exists between the actual value which ought to be compensated and the estimated value. Further, proof strength against distortion factors other than wavelength dispersion such as polarization mode dispersion becomes lowered. Accordingly, it is important to reduce the error against the wavelength dispersion compensation amount.

As described above, there has been a problem that long time is required until detection for control using a monitor signal and occurrence of an estimation error is required to be considered for a dispersion estimation method using a known signal.

Then, the present invention aims to provide a wavelength dispersion amount estimation method, a wavelength dispersion compensation circuit, and a receiving device which rapidly estimate and set a wavelength dispersion amount to compensate with high accuracy at a receiving device which compensates waveform distortion at an optical fiber transmission path to resolve the above issues.

Solution to Problem

To achieve the above aim, the wavelength dispersion amount estimation method according to the present invention includes steps of:

(1) setting an arbitrary value as a first candidate value of a wavelength dispersion amount, (2) extracting plural values close to the first candidate value to set as second candidate values, (3) measuring strength of a digital clock extracting signal corresponding to each candidate value, (4) extracting an optimum value (the value which becomes the largest) from the tendency of fluctuation of the plural signal strength and to set the value as the next first candidate value, (5) performing evaluation while repeating (2) to (4) until a specific condition is satisfied.

Specifically, the wavelength dispersion amount estimation method according to the present invention is a wavelength dispersion amount estimation method to estimate a dispersion compensation amount for compensating waveform distortion due to wavelength dispersion at an optical fiber transmission path, performing an initial value setting step to set a dispersion compensation amount $D(0)$ which is an initial value ($k=0$) of a kth dispersion compensation amount $D(k)$ (k is an integer), a clock detecting step to detect and store strength of a symbol arrival timing clock included in received data at the dispersion compensation amount $D(k)$ as a clock detection value $S(k)$, a plus side shifting step to detect and store strength of the symbol arrival timing clock at a dispersion compensation amount $D(k)+\Delta D$ which is obtained by shifting the dispersion compensation amount $D(k)$ to a plus side by a specific amount $\Delta D$ as a clock detection value $S(k+)$, a minus side shifting step to detect and store strength of the symbol arrival timing clock at a dispersion compensation amount $D(k)-\Delta D$ which is obtained by shifting the dispersion compensation amount $D(k)$ to a minus side by the specific amount $\Delta D$ as a clock detection value $S(k-)$, a comparing step to compare the clock detection value $S(k)$, the clock detection value $S(k+)$, and the clock detection value $S(k-)$, and an evaluating step to determine to complete estimation of the dispersion compensation amount as determining the dispersion compensation amount $D(k)$ as an optimum dispersion compensation amount when the clock detection value $S(k)$ is the largest, and to perform the clock detecting step, the plus side shifting step, the minus side shifting step, and the comparing step once again with the dispersion compensation amount of the largest clock detection value set as a k+1th dispersion compensation amount $D(k+1)$ when the clock detection value $S(k+)$ or the clock detection value $S(k-)$ is the largest, as a result of the comparing step.

When a clock detection value of a dispersion compensation amount and a clock detection value of a dispersion compensation amount in the vicinity thereof are compared, it is conceivable that an optimum clock detection value, that is, an optimum dispersion compensation amount exists in the direction of the dispersion compensation amount with a larger clock detection value. Accordingly, the optimum dispersion compensation value can be obtained by comparing the clock detection values in a comparing procedure and adjusting the dispersion compensation amount to the direction which enlarges the clock detection value.

Accordingly, the present invention can provide a wavelength dispersion amount estimation method which rapidly estimates and sets a wavelength dispersion amount to compensate with high accuracy at a receiving device which compensates waveform distortion at an optical fiber transmission path.

The wavelength dispersion amount estimation method according to the present invention includes an approximate dispersion compensation amount acquiring step in which an approximate value of the dispersion compensation amount is acquired before the initial value setting step and the approximate value of the dispersion compensation amount is set as the dispersion compensation amount $D(0)$ in the initial value setting step.

In the first step, a coarse estimated value is set as the initial value of the dispersion compensation amount estimated with a wavelength dispersion estimation method using a known signal (e.g., see Patent Literature 4) or the like. Estimation of an optimum dispersion compensation amount can be performed in a short time by performing a step to perform fine adjustment after the first step.

In the wavelength dispersion amount estimation method according to the present invention, an acceptable repeating number K (K is a natural number) is set and estimation of the dispersion compensation amount is completed when k=K through comparison of k and K in the evaluating step. Accordingly, endless estimation of the optimum dispersion compensation amount can be prevented.

In the wavelength dispersion amount estimation method according to the present invention, the specific amount $\Delta D$ for shifting the dispersion compensation amount in the plus side shifting step and the minus side shifting step is an amount dividing dispersion proof strength capable of detecting the symbol arrival timing clock by the acceptable repeating number K. Accordingly, estimation of the optimum dispersion compensation amount can be performed with high accuracy.

In the wavelength dispersion amount estimation method according to the present invention, a minute amount $\delta D$ which is smaller than the specific amount $\Delta D$ for shifting the dispersion compensation amount in the plus side shifting step and the minus side shifting step is set, a clock detection value $S(k\pm 0)$ at the dispersion compensation amount $D(k)$ and clock detection values $S(k\pm n\delta)$ at dispersion compensation amounts D(k)±nδD (n is a natural number) whose dispersion compensation amount D(k) is a center value are detected and the clock detection value S(k) is obtained by averaging the clock detection value S(k±0) and the clock detection values S(k±nδ) in the clock detecting step, a clock detection value S(k±0+) at the dispersion compensation amount D(k)+ΔD and clock detection values S(k±nδ+) at dispersion compensation amounts D(k)+ΔD±nδD (n is a natural number) whose dispersion compensation amount D(k)+ΔD is the center value are detected and the clock detection value S(k+) is obtained by averaging the clock detection value S(k±0+) and the clock detection values S(k±nδ+) in the plus side shifting step, and a clock detection value S(k±0−) at the dispersion compensation amount D(k)−ΔD and clock detection values S(k±nδ−) at dispersion compensation amounts D(k)−ΔD±nδD (n is a natural number) whose dispersion compensation amount D(k)−ΔD is the center value are detected and the clock detection value S(k−) is obtained by averaging the clock detection value S(k±0−) and the clock detection values S(k±nδD−) in the minus side shifting step.

Stabilization can be achieved even when local variation exists by averaging the clock detection values around the dispersion compensation amount.

In the wavelength estimation method according to the present invention, at least one of the clock detecting step, the plus side shifting step, and the minus side shifting step is repeated plural number of times at a specific time interval.

Stabilization can be achieved even when local variation exists by time averaging the clock detection values.

In the wavelength dispersion amount estimation method according to the present invention, estimation of the dispersion compensation amount is completed while the dispersion compensation amount D(k) is determined as an optimum dispersion compensation amount when a difference between the clock detection value S(k) and the clock detection value S(k+) and a difference between the clock detection value S(k) and the clock detection value S(k−) are smaller than a predetermined threshold value in the evaluating step.

Estimation operation can be stabilized by avoiding to perform estimation in a state that difference among the clock detection values are small and the direction of which the optimum value exists is uncertain.

The wavelength dispersion compensation circuit according to the present invention includes an analog-digital convertor which converts optical analog waveform received from the optical fiber transmission path into a digital signal, a digital signal processor which compensates waveform distortion due to wavelength dispersion at the optical. fiber transmission path of the digital signal output from the analog-digital convertor with the dispersion compensation amount estimated with the wavelength dispersion amount estimation method, and a symbol clock extractor which extracts a symbol arrival timing clock of received data included in the digital signal output from the analog-digital convertor and outputs strength of the symbol arrival timing clock as the clock detection value.

The wavelength dispersion compensation circuit according to the present invention adopts the wavelength dispersion amount estimation method. Accordingly, the present invention can provide a wavelength dispersion compensation circuit which rapidly estimates and sets a wavelength dispersion amount to compensate with high accuracy at a receiving device which compensates waveform distortion at an optical fiber transmission path.

The receiving device according to the present invention includes the wavelength dispersion compensation circuit.

The receiving device according to the present invention includes the wavelength dispersion compensation circuit. Accordingly, the present invention can provide a receiving device which rapidly estimates and sets a wavelength dispersion amount to compensate with high accuracy at a receiving device which compensates waveform distortion at an optical fiber transmission path.

Advantageous Effects of Invention

The present invention can provide a wavelength dispersion amount estimation method, a wavelength dispersion compensation circuit, and a receiving device which rapidly estimate and set a wavelength dispersion amount to compensate with high accuracy at a receiving device which compensates waveform distortion at an optical fiber transmission path.

DESCRIPTION OF EMBODIMENTS

Embodiments of the present invention will be described with reference to the attached drawings. Embodiments described below are examples of the present invention and the present invention is not limited to the following embodiments. In the present application and drawings, the same structural elements are denoted by the same reference.

Figure 8:
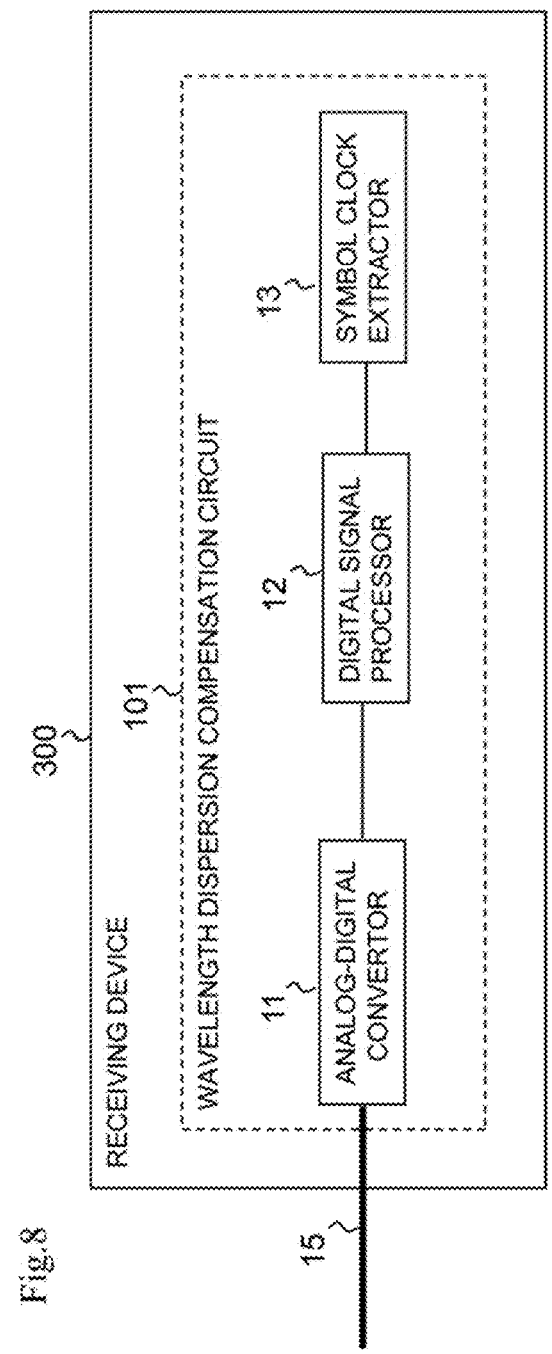
FIG. 8 is an explanatory view of a receiving device according to the present invention.

FIG. 8 is an explanatory view of a receiving device 300 according to the present embodiment. The receiving device 300 includes a wavelength dispersion compensation circuit 101. The wavelength dispersion compensation circuit 101 includes an analog-digital converter 11 which converts an optical analog waveform received from an optical fiber transmission path to a digital signal, a digital signal processor 12 which compensates waveform distortion of the digital signal output from the analog-digital converter 11 due to wavelength dispersion of the optical fiber transmission path with a dispersion compensation amount estimated with a wavelength dispersion amount estimation method described in the following, and a symbol clock extractor 13 which extracts a symbol arrival timing clock of received data contained in the digital signal output from the analog-digital converter 11 and outputs strength of the symbol arrival timing clock as the clock detection value.

Embodiments of the wavelength dispersion amount estimation method performed by the digital signal processor 12 will be described.

First Embodiment

First, as a coarse adjustment process, a coarse estimated value estimated by a wavelength dispersion estimation method using a known signal or the like is set to a dispersion compensation circuit as an initial value. At this time, most part of the wavelength dispersion is compensated and a waveform receiving waveform distortion due to residual dispersion occurring for an estimation error and the like is output from the dispersion compensation circuit.

Figure 1:
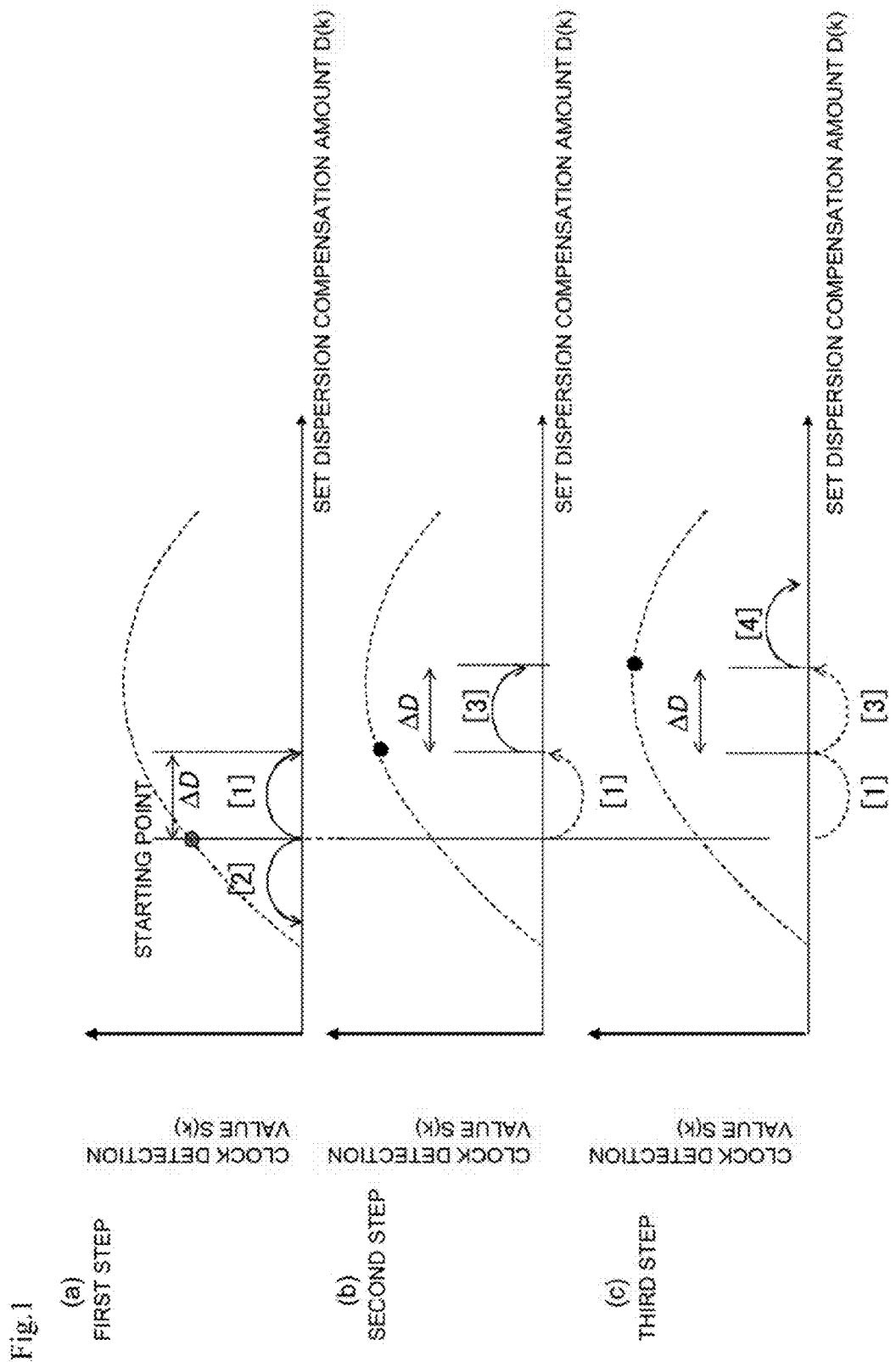
FIGS. 1(a) to 1(c) are explanatory views of a wavelength dispersion amount estimation method according to the present invention.
Figure 2:
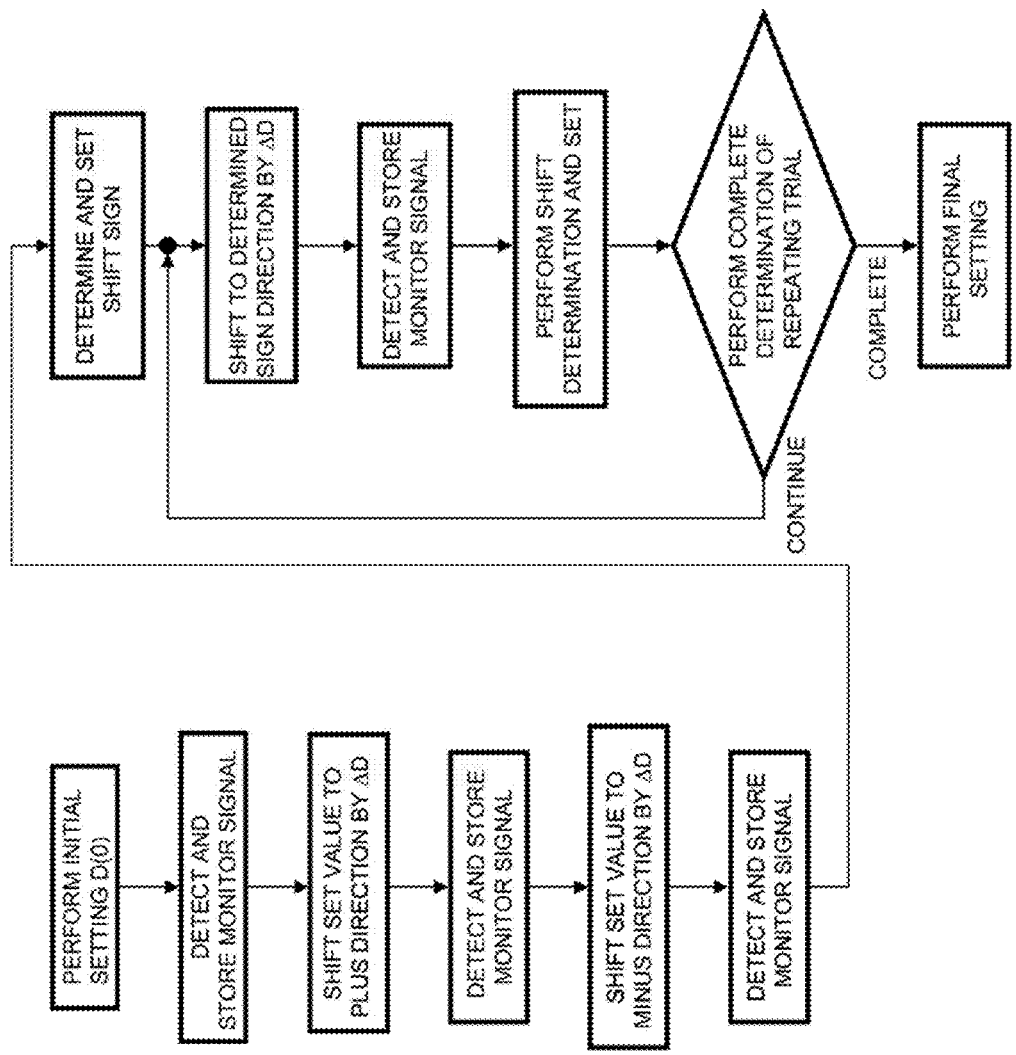
FIG. 2 is a flow diagram illustrating the wavelength dispersion amount estimation method according to the present invention.

Subsequently, a fine adjustment process starts. FIGS. 1(a) to 1(c) and FIG. 2 are explanatory views of the fine adjustment process according to the present embodiment. D(k) denotes a dispersion compensation amount set to the digital signal. processor 12. First, as the first step, a dispersion compensation amount D(0) for the initial value k=0 is set and a detection signal value of clock synchronization is measured and stored on a memory. This value is denoted as a clock detection value S(0). Next, following processes are performed as the first step as illustrated in FIG. 1(a).

[1] The dispersion compensation amount is shifted to the plus direction for a specific value ΔD from the dispersion compensation amount D(0) (dispersion compensation amount D(0)+Δ). Then, a clock detection value S(0+) of clock synchronization is measured and stored.

[2] Similarly, the dispersion compensation amount is shifted to the minus direction for the specific value ΔD from the dispersion compensation amount D(0) (dispersion compensation amount D(0)−Δ). A clock detection value S(0−) of clock synchronization at that time is measured and stored.

The specific value ΔD can be set to 500 psec/nm or smaller. However, it is preferable to set based on a target value of a wavelength dispersion gap amount after adjusted with the fine adjustment process. For example, if an adaptive filter having the tap number in the range of 10 to 20 and a delay amount per tap in the range of 15 to 20 psec/nm is adopted and the target value is in the range of ±(100 to 150) psec/nm, ΔD is set to be in a range of 25 to 150 psec/nm. Accuracy of the fine adjustment is improved by setting ΔD finely. However, the setting needs time until the fine adjustment completes. Therefore, it is desired to set ΔD considering the balance between accuracy and time. For example, with the above target value, ΔD is set to 50 psec/nm considering the balance between accuracy and time.

It is conceivable that an optimum value exists in the sign direction where the clock detection value is large. Therefore, S(0), S(0+), and S(0−) are compared. When the clock detection value satisfies S(0+)>S(0−), a next dispersion compensation amount D(1) is set to D(0)+ΔD. Conversely, when the clock detection value satisfies S(0+)<S(0−), the next dispersion compensation value D(1) is set to D(0)−ΔD. When both of S(0+) and S(0−) are smaller than S(0), that is, when S(0)>S(0+) and S(0)>S(0−) are satisfied, the dispersion compensation value D(1) is set to D(0).

Here, assuming a case of S(0+)>S(0−), following processes will be described as the dispersion compensation amount D(1) is set to D(0)+ΔD.

As a second step illustrated in FIG. 1(b), a clock detection value S(1) for the dispersion compensation amount D(1)=D(0)+ΔD is measured and stored.

[3] Next, the dispersion compensation amount is further shifted to the plus direction by ΔD. A clock detection value S(1+) when the dispersion compensation amount is set to D1+ΔD is detected and stored on the memory.

Since shifting was performed to the plus direction in the first step, the dispersion compensation amount was shifted to the plus direction as D(1)+ΔD. However, when shifting is performed to the minus direction in the first step, the dispersion compensation amount is shifted to the minus direction as well in the second step as D(1)−ΔD. Comparing both of the clock detection value S(1) and S(1+), a dispersion compensation amount D(2) is set to D(1)+ΔD when S(1+)>S(1) and steps are completed when S(1+)<S(1).

In the above example, the dispersion compensation amount D(1) is only compared with D(1)+ΔD. However, a process to measure and store a detection signal value S(1−) by shifting to the inverse side as D(1)=D(0)−ΔD may be added. In a case of preceding the optimum sequence by shifting only to one sign direction, the direction determined in the first step determines the shifting direction of all steps thereafter. Therefore, there is a possibility that the dispersion compensation amount does not converge to the proper optimum dispersion compensation value in a situation that time variability or detection error is assumed for the clock detection signal. By measuring the detection signal at a point shifting to the plus side and a point shifting to the minus side for each step, there is an advantage that the shifting direction can be determined at each step. Here, since D(1)−ΔD and D(0) are the same value being a previously measured point, D(1)−ΔD thereof is not necessary to detect.

Here, assuming a case of S(1+)<S(1), following processes will be described as the dispersion compensation amount D(2) is set to D(1)+ΔD.

As a third step illustrated in FIG. 1(c), a clock detection value S(2) for the dispersion compensation amount D(2) is firstly measured.

[4] Then, the dispersion compensation amount is shifted to the plus direction by ΔD from D(2). A clock detection value S(2+) thereof is measured and stored on the memory. Then, comparing the both, a dispersion compensation amount D(3) is set to D(2)+ΔD when S(2+)>S(2) and steps are completed when S(2+)<S(2).

The wavelength dispersion amount estimation method of the present embodiment is a method to asymptotically acquire an optimum dispersion compensation amount by repeating the similar processes thereafter.

Here, since the detection signal primarily includes an error, there is an opportunity to set S(k) again and redo measurement when difference between S(k+), S(k−), and S(k) are small. Owing to the above, risk of inducing unstable operation by shifting on a basis of uncertain information can be reduced in a situation where the difference is small and the direction in which the optimum value exists is uncertain to be whether plus or minus.

In the above method, the process determines the set value of the dispersion compensation amount with one measurement value of the clock detection signal for each set value. Accordingly, when an error at the measurement is large, there is a possibility that the sequence of optimization becomes an unstable operation. As a method for stabilization, by measuring plural times at different time for each set value and determining which direction of plus or minus sign to shift by comparing the mean value thereof, stabilization of the operation is expected.

In the above example, a coarse estimated value of the dispersion estimation circuit is used as the initial value of the dispersion compensation amount. However, there are cases that an externally provided dispersion value is set. As such an example, a case is conceivable such as that a dispersion amount of a transmission path is previously measured with a dispersion measuring machine.

Second Embodiment

There is a possibility that residual dispersion dependence of the detection signal of the clock synchronization circuit locally surges. In this case, in the first embodiment, there are cases that determination of whether to shift to the plus direction or to shift to the minus direction is difficult owing to the local variation. According to the present embodiment, the dispersion compensation amount can be stably estimated by determining the shift direction of the dispersion compensation amount with high accuracy owing to averaging even in a situation that local residual dispersion dependence exists.

Figure 3:
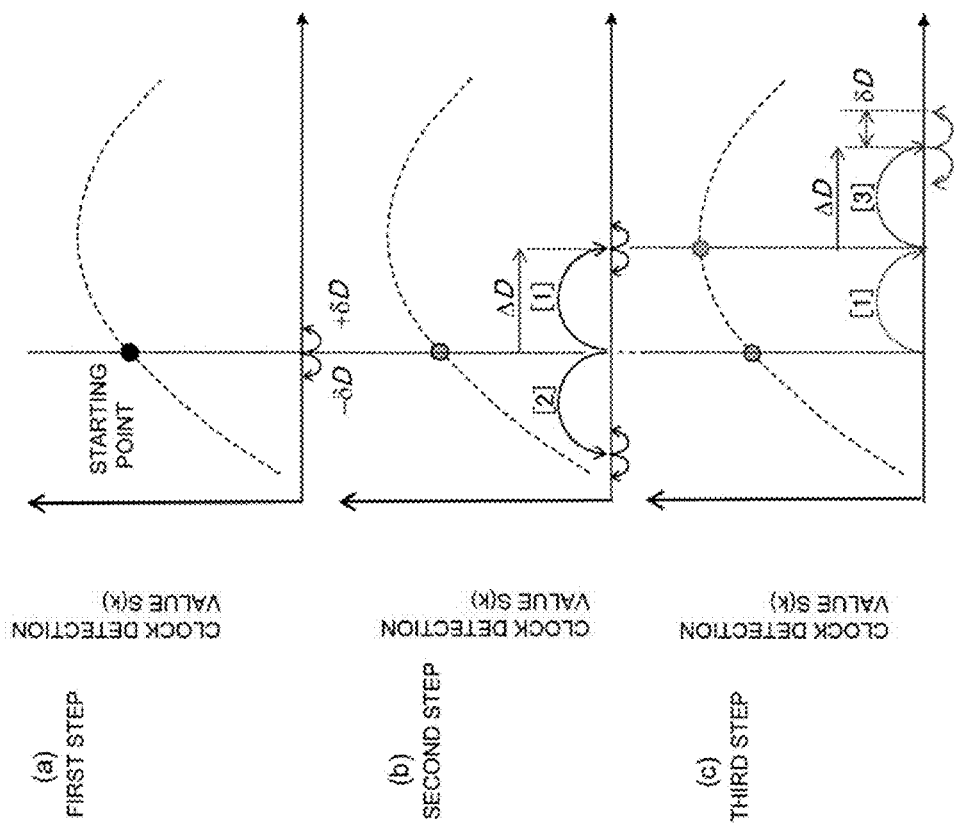
FIGS. 3(a) to 3(c) are explanatory views of the wavelength dispersion amount estimation method according to the present invention.

FIGS. 3(a) to 3(c) are explanatory views of a fine adjustment process according to the present embodiment. As illustrated in FIG. 3(a), each of the dispersion compensation amount D(k) is shifted to the plus direction by a minute amount δD from D(k). Then, a clock detection value S(k+δ) of the clock synchronization is measured and stored. Subsequently, the dispersion compensation amount is shifted to the minus direction by δD from D(k) and a clock detection value S(k−δ) of the clock synchronization at that time is measured and stored on the memory. Further, the dispersion compensation amount is shifted to the plus direction by 2δD from D(k) and a clock detection value S(k+2δ) of the clock synchronization is measured and stored on the memory. Similarly, the dispersion compensation amount is shifted by −2δD from D(k) and a clock detection value S(k−2δ) of the clock synchronization is measured and stored on the memory. in this manner, the dispersion compensation amount is shifted to the plus direction and the minus direction for δD steps and the clock detection values S(k±nδ) are detected and stored on the memory.

The minute amount δD is set based on a cycle and amplitude of a ripple occurring at a clock detection value S(k) for the dispersion compensation amount of FIGS. 3(a) to 3(c). Specifically, the minute amount δD may be equal to or less than the cycle of the ripple. For example, when the amplitude of the ripple is about 10% of the clock detection value S(k), an average varying amount of the clock detection value S(k) at the time of shifting the set dispersion compensation amount D(k) by ΔD is to be less than 10% of the clock detection value S(k). Here, as another specific example, the minute amount δD may be set in a range of one third to one fifty of the constant amount ΔD and preferably in a range of one fifth to one tenth. Further, as a specific numeral, when ΔD is in a range of 25 to 150 psec/nm, δD may be set in a range of 5 to 25 psec/nm and preferably in a range of 5 to 15 psec/nm.

The above is repeated for specified N times. Here, N is set considering the balance between accuracy and time as well. For example, N may be set to be three or more and seven or less. Then, a representative value for D(k) is calculated using a clock detection S(k±nδ) which is measured by shifting for δD steps from D(k), which is the center, and stored. Averaging procedure (addition procedure) may be performed to n and an average value Savg(k) may be calculated as a method for calculating the representative value. For example, a calculation example of Savg(k) may be defined as the following expression.

$$Savg(k) = S(k) + \sum_{n=1}^{N} S(k \pm n \cdot \delta)$$ [Expression 1]

As illustrated in FIG. 3(b), after acquiring Savg(k) at a dispersion compensation amount D(k), the dispersion compensation amount is shifted to the plus side or minus side by ΔD, as described in the first embodiment, and Savg(k+1) is acquired as described above ([1] [2]). Then, Savg(k+2) and later are sequentially acquired by determining the direction of the dispersion compensation amount and further shifting the dispersion compensation amount by ΔD ([3]).

In this manner, the wavelength dispersion amount estimation method of the present embodiment can achieve stabilization even when local variation exists by averaging clock detection values at plural circumferential points shifted in δD steps at each of the dispersion compensation amount D(k).

Third Embodiment

In the first embodiment and the second embodiment, since the dispersion shift width is ΔD, optimization cannot be performed more finely. A method to resolve this point is described in the present embodiment.

Firstly, the first step of a coarse adjustment process and a fine adjustment process is similar to the description of the first embodiment. Here, the dispersion compensation amount D(k) was described with k as the setting number in the first embodiment. In the present embodiment, the dispersion compensation amount D(k,m) is described with k and m as the setting numbers. Here, k is a trial number of the first half process to compare the clock detection values in the plus direction or minus direction and m is a trail number of the latter half process to shift to the determined direction.

As a result of comparison among S(0), S(0+), and S(0−), a dispersion compensation amount D(1,0) is set to D(0)+ΔD when the clock detection value satisfies S(0+)>S(0−). In contrast, the dispersion compensation amount D(1,0) is set to D(0)−ΔD when the clock detection value satisfies S(0+)<S(0−). Further, the dispersion compensation amount D(1,0) is set to D0 when S(0)>S(0+) and S(0)>S(0−).

Here, assuming a case of S(0+)>S(0−), following processes will be described as the dispersion compensation amount D(1,0) is set to D(0)+ΔD.

Since the dispersion compensation amount is determined to shift to the plus direction in the first half of the first step as described above, the dispersion compensation amount is further shifted to the plus direction by ΔD to be D(1,0)+ΔD in the latter half of the first step. In a case that the dispersion compensation amount is shifted to the minus direction in the first half of the first step, shifting will be performed to the minus direction by ΔD in the latter half of the first step as well.

A clock detection value S(1,0+) when the dispersion compensation amount is set to D(1,0)+ΔD is detected and stored on the memory. Then, the clock detection value S(1,0) at the time of D(1,0) and the clock detection value S(1,0+) at the time of D(1,0)+ΔD are compared. When S(1,0+)>S(1,0) is satisfied, the dispersion compensation amount D(1,1) is determined to shift to D(1,0)+ΔD.

Figure 4:
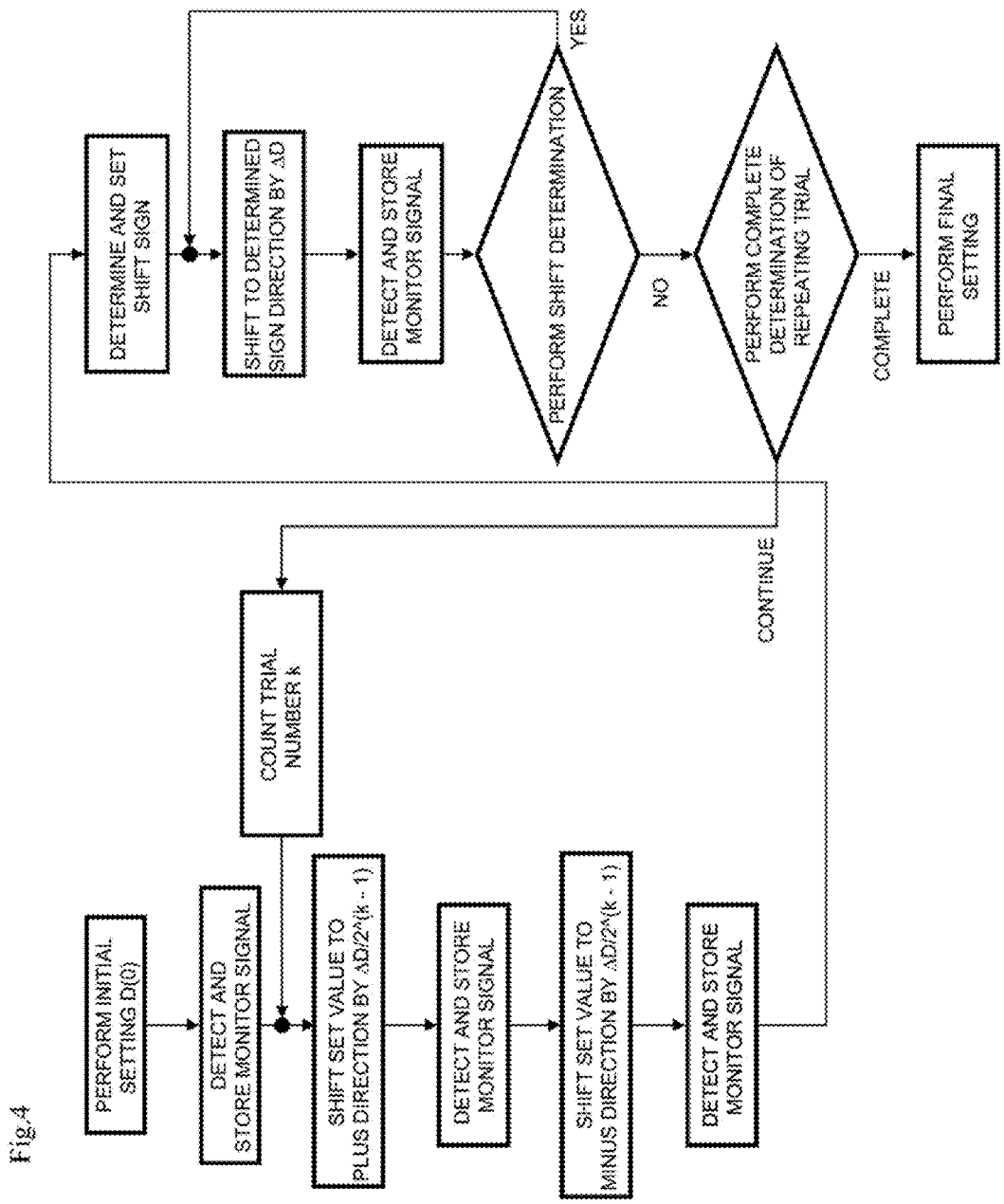
FIG. 4 is a flow diagram illustrating the wavelength dispersion amount estimation method according to the present invention.

The above corresponds to selecting "Yes" in a shift determination in FIG. 4. In this case, a clock detection value S(1,1+) is measured and stored by shifting the dispersion compensation amount to the plus direction by ΔD and setting to D(1,1)+ΔD. A clock detection value S(1,1) at D(1,1) and the clock detection value S(1,1+) at D(1,1)+ΔD are compared. When "Yes" is selected in the shift determination in FIG. 4, the procedure of shift determination is to be repeated.

On the other hand, in a case that S(1,0+Δ)<S(1,0) is satisfied, shifting by the width of ΔD is determined to be unnecessarily any more. The above corresponds to selecting "No" in the shift determination in FIG. 4. In this case, the trial number count k of the first half is incremented and the shifting amount ΔD is halved to ΔD/2. Then, the steps return to comparing the strength of the detection signal in both shifting directions of the plus direction and the minus direction.

In the above example, only the dispersion compensation amount D(1,0) and D(1,0)+ΔD are compared in the step of shift determination. However, a process to measure and store a detection signal value S(1,0−Δ) by shifting to the inverse side D(1,0)−ΔD may be added.

With the optimum sequence shifting only to one sign direction, the determined direction in the first step determines the shifting direction of the latter half process thereafter. Therefore, there is a possibility that the dispersion compensation amount does not converge to the proper optimum dispersion compensation value in a situation that time variability or detection error is assumed for the clock detection signal. In the present embodiment, the clock detection value is measured at a point shifting the dispersion compensation value to the plus side and a point shifting to the minus side at each step, so that the shifting direction can be determined at each step. Therefore, the present embodiment has an advantage that the dispersion compensation amount converges to the proper optimal dispersion compensation value even in a situation that time variability or detection error is assumed for the clock detection signal. Here, since D(1,0)−ΔD and the previously measured D(0) are the same value, for example in the above example, D(1,0)−ΔD is not necessary to detect.

Next, the first half procedure of the second step will be described. Here, description will be performed assuming a case that shifting to the plus side is selected in the first half procedure in the first step, "Yes" is selected in the first shift determination in the latter half procedure, and "No" is selected in the second shift determination. That is, the dispersion compensation amount is assumed to be completed as D(1,1)=D(O)+2ΔD in the first step.

In the first half of the second step, the dispersion compensation amount is shifted to the plus direction and the minus direction by ΔD/2 from D(1,1)=D0+2ΔD, which is the center, with k set to 2. Then, the strength of the detection signal is measured at each and stored to determine the direction in which the strength of the detection signal becomes stronger. Clock detection values S(1,1+ΔD/2) and S(1,1−ΔD/2) at each cases of being set to D(1,1)+ΔD/2 and D(1,1)−ΔD/2 are detected and stored on the memory.

Then, the both are compared and the shift direction is determined to be the plus side when S(1,1+ΔD/2)>S(1,1−ΔD/2) and a dispersion compensation amount D(2,0) is set to D(1,1)+ΔD/2. Meanwhile, the shift direction is determined to be the minus side when S(1,1+ΔD/2)<S(1,1−ΔD/2) and D(2,0) is set to D(1,1)−ΔD/2.

Further, D(2,0) is set to D(1,1) when both of S(1,1+ΔD/2) and S(1,1−ΔD/2) are smaller than S(1,1), that is, when S(1,1)>S(1,1+ΔD/2) and S(1,1)>S(1,1−ΔD/2).

Next, description of the latter half of the second step will be performed. Here, similarly to the first step, the dispersion compensation amount further shifts to the plus direction by ΔD/2 when determined to be the plus direction in the first half of the second step. Meanwhile, the dispersion compensation amount further shifts to the minus direction by ΔD/2 when determined to be the minus direction. Meanwhile, when the dispersion compensation amount is determined not to shift, since shifting by the width of ΔD/2 is determined to be unnecessarily any more, the step proceeds to the procedure of "No" in the shift determination.

Here, description is performed assuming a case that the dispersion compensation amount is determined to shift to the minus direction. The dispersion compensation amount is further shifted to the minus direction by ΔD/2 to be set to D(2,0)−ΔD/2 and a clock detection value S(2,0−ΔD/2) is detected and stored on the memory. Then, D(2,0) and D(2,0)−ΔD/2 are compared. When S(2,0−ΔD/2)>S(2,0), the dispersion compensation amount is judged to shift to D(2,1)=D(2,0)−ΔD/2. The above corresponds to selecting "Yes" in the shift determination in FIG. 4. In this case, the procedure of measuring and storing the detection signal after further shifting to the minus direction by ΔD/2 is performed and the procedure of shift determination is repeated.

Meanwhile, shifting by the width of ΔD/2 is judged to be unnecessarily any more when S(2,0−ΔD/2)<S(2,0). The above corresponds to the case of selecting "No" in the shift determination. In this case, the trial number count (k,n) is incremented and the step returns to the first step of comparing the detection signal strength in both shifting directions of the plus direction and the minus direction. Here, the shifting amount is halved to ΔD/4 from ΔD/2. In the following, the similar process is repeated to search the optimum dispersion compensation amount.

By halving the shifting width of the dispersion compensation amount as $\Delta D/(2^{k-1})$ as the trial number k becomes large, the optimum value of the dispersion compensation amount can be searched with high accuracy and further efficiently.

Fourth Embodiment

There is a possibility that residual dispersion dependence of the detection signal of the clock synchronization circuit locally surges. In this case, there is a possibility that determination of whether to shift to the plus direction or to shift to the minus direction becomes difficult owing to the local variation with the wavelength dispersion amount estimation method of the third embodiment. Further, there is a possibility that determination of the shifting times at the shift determination becomes difficult. According to the present embodiment, stable operation can be achieved by averaging and determining the shift direction of the dispersion compensation amount with high accuracy even in a situation that residual dispersion dependence exists locally.

Figure 5:
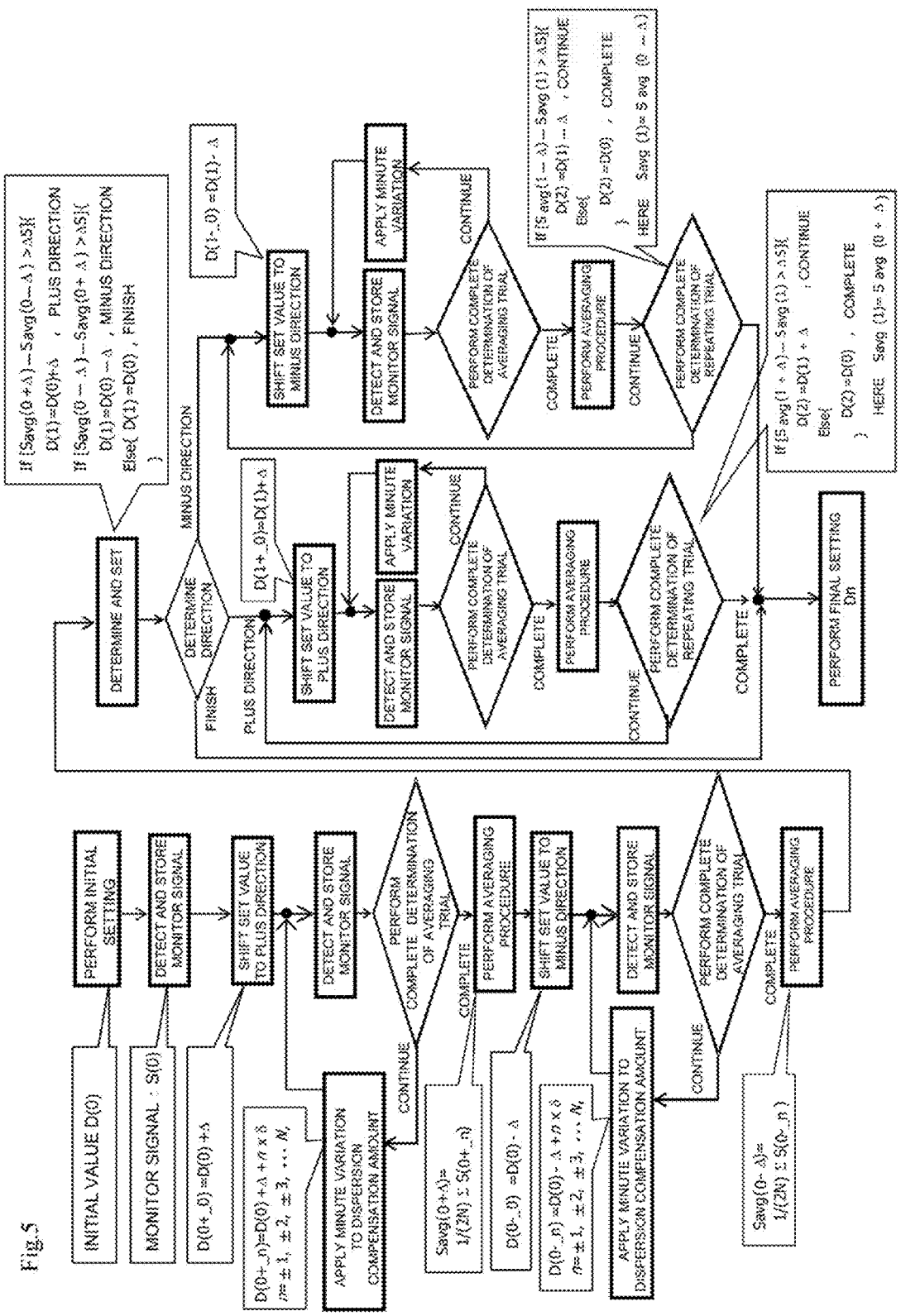
FIG. 5 is a flow diagram illustrating the wavelength dispersion amount estimation method according to the present invention.

FIG. 5 is an explanatory view of the fine adjustment process of the present embodiment. As illustrated in FIG. 5, the dispersion compensation amount set value D(k,m) is shifted to the plus direction by a minute amount δD from D(k,m) for each of the dispersion compensation amount set value. Then, a clock detection value S(k,m+δ) of the clock synchronization is measured and stored. Then, the dispersion compensation amount set value is shifted to the minus direction by δD from D(k,m). A clock detection value S(k,m−δ) of the clock synchronization at that time is measured and stored on the memory. Further, a clock detection value S(k,m+2δ) of the clock synchronization is measured by shifting the initial value to the plus direction by 2δD and is stored on the memory. Similarly, a clock detection value S(k,m−2δ) of the clock synchronization is measured for the set value shifted to the minus direction by −2δD from the initial value and is stored on the memory. In this manner, the dispersion compensation amount is shifted to the plus direction and the minus direction in the δD step and clock detection values S(k,m±nδ) are detected and stored on the memory. The above is repeated for the specified N times.

Then a representative value for D(k,m) is calculated from a clock detection S(k,m±nδ) measured and stored by shifting for δD steps from D(k), which is the center. Averaging procedure (addition procedure) may be performed to n and the average value Savg(k,m) may be calculated as a method for calculating the representative value. For example, a calculation example of Savg(k,m) may be defined as the following expression.

$$Savg(k, m) = S(k, m) + \sum_{n=1}^{N} S(k, m \pm n \cdot \delta) \quad \text{[Expression 2]}$$

As described above, the wavelength dispersion amount estimation method of the present embodiment achieves stabilization even when local variation exists by averaging clock detection values at plural circumferential points shifted by δD steps at each of the dispersion compensation amount D(k,m).

Fifth Embodiment

There is a possibility that residual dispersion dependence of the detection signal of the clock synchronization circuit locally surges. In this case, there is a possibility that determination of whether to shift to the plus direction or to shift to the minus direction becomes difficult owing to the local variation with the wavelength dispersion amount estimation method of the third embodiment. According to the present embodiment, stable operation can be achieved by averaging and determining the shift direction of the dispersion compensation amount with high accuracy even in a situation that residual dispersion dependence exists locally.

Figure 7:
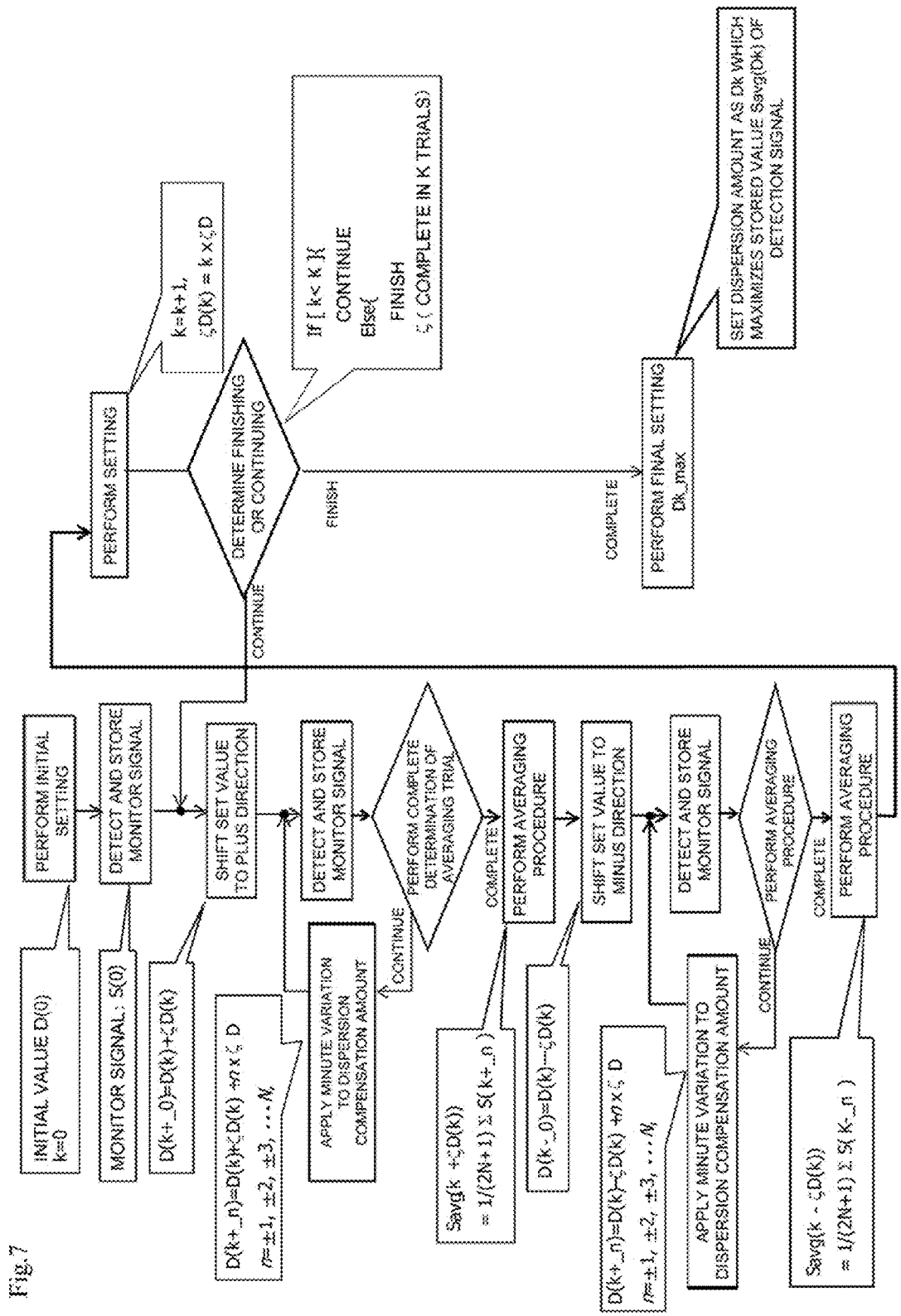
FIG. 7 is a flow diagram illustrating the wavelength dispersion amount estimation method according to the present invention.

FIG. 7 is an explanatory view illustrating the fine adjustment process of the wavelength dispersion amount estimation method according to the present embodiment. The coarse adjustment process which is performed previously is similar to the description of the first embodiment.

Figure 6:
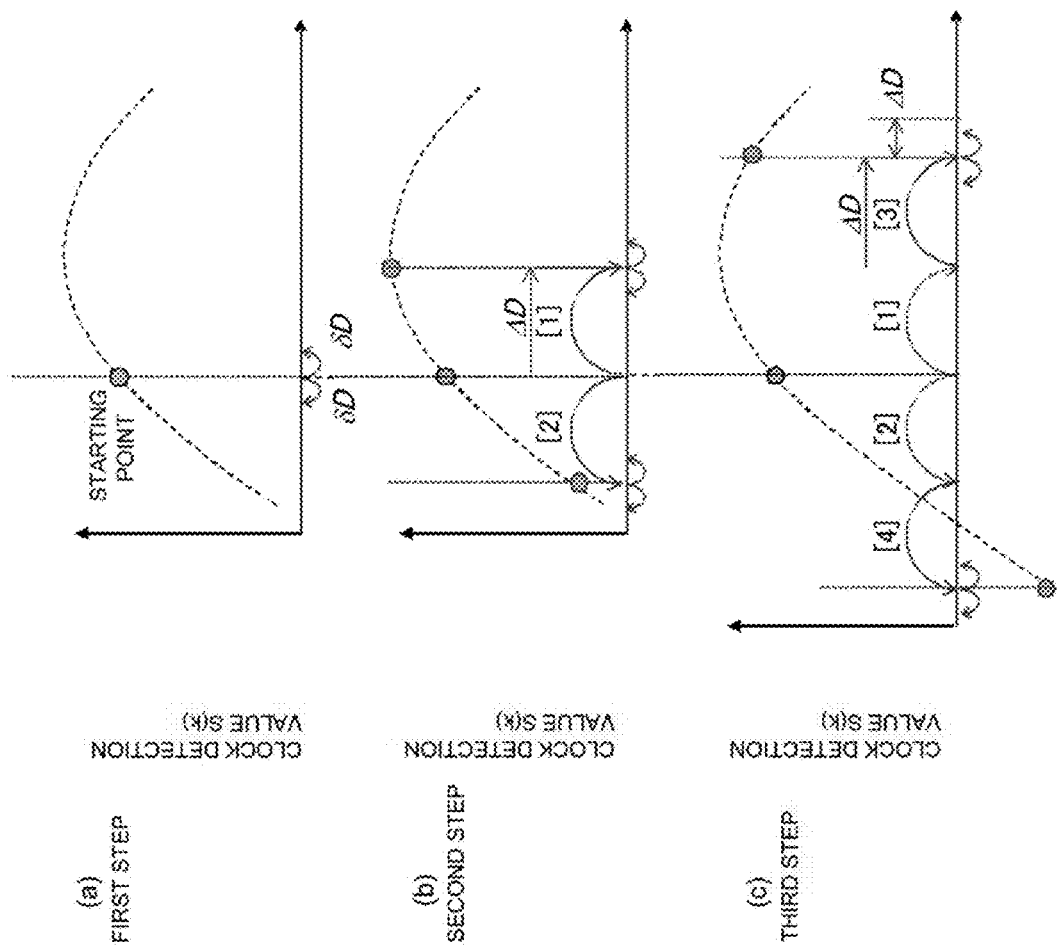
FIGS. 6(a) to 6(c) are explanatory views of the wavelength dispersion amount estimation method according to the present invention.

The following fine adjustment process is as follows. A clock detection signal value of a sampling clock extracting circuit is measured and stored with the dispersion compensation amount for the dispersion compensation amount circuit set to an initial value D(0). This is denoted as S(0). Next, as illustrated in FIG. 6(a), the dispersion compensation amount is shifted to the plus direction by a minute amount δD from the initial value D(0). Then, a clock detection value S(0+δ) is measured and stored. Next, the dispersion compensation amount is shifted to the minus direction from the initial value D(0) by the minute amount δD and a clock detection value S(0−δ) at that time is measured and stored on the memory. Further, a clock detection value S(0+2δ) of the clock synchronization is measured by shifting from the initial value D(0) to the plus direction by 2δD and is stored on the memory. Similarly, a clock detection value S(0−2δ) of the clock synchronization is measured by shifting from the initial value D(0) to the minus direction by −2δD and is stored on the memory. As described above, the dispersion compensation amount is shifted to the plus direction and the minus direction in the δD step and clock detection values S(0±nδ) are detected and stored on the memory. The above is repeated for the specified N times.

As illustrated in FIG. 6(b), in the next step, the dispersion compensation amount is shifted to the plus direction by ΔD from D(0) and a clock detection value S(0+Δ) is detected and stored on the memory ([1]). Further, the dispersion compensation amount is shifted to the plus direction and the minus direction in δD steps and clock detection values S(0+Δ±nδ) are detected and stored on the memory. The above is repeated for N times. Here, generally, δD is a small amount compared to ΔD.

Similarly, as illustrated in FIG. 6(b), a clock detection value S(0−Δ) is detected and stored on the memory by shifting to the minus direction by ΔD from D(0) ([2]). In addition, clock detection values S(0−Δ±nδ) are detected by shifting to the plus direction and the minus direction in δD steps and stored on the memory. The above is repeated for N times.

As illustrated in FIG. 6(c), further in the next step, the dispersion compensation amount is shifted to the plus direction by 2ΔD from D(0) and a clock detection value S(0+2Δ) is detected and stored on the memory ([3]). Further, the dispersion compensation amount is shifted to the plus direction and the minus direction in δD steps and clock detection values S(0+2Δ±nδ) are detected and stored on the memory. Similarly, the dispersion compensation amount is shifted to the minus direction by 2ΔD from D(0) and a clock detection value S(0−2Δ) is detected and stored on the memory ([4]). In addition, clock detection values S(0−2Δ±nδ) are detected by shifting to the plus direction and the minus direction in δD steps and stored on the memory. The above is repeated for N times.

In the following steps, similar procedures are repeated. Detecting a clock detection value S(0+kΔ±nδ) and storing on the memory is repeated until the natural integer k reaches a set maximum value K. Here, n denotes 0, 1, . . . , and N.

The clock detection values S(0+kΔ±nδ) acquired from each of k=0, 1, . . . , K are averaged against n and the optimum value is determined from k=0, 1, . . . , K. As an example of averaging, averaging process (addition process) is performed for n against the clock detection values S(0+kΔ±nδ) for each k and an average value Savg(0+kΔ) is calculated for the each. For example, a calculation example of Savg(0+kΔ) may be defined as the following expression.

$$Savg(0 + k\Delta) = \sum_{n=0}^{N} S(0 + k\Delta \pm n \cdot \delta) \quad \text{[Expression 3]}$$

As another embodiment, a method of averaging using a forgetting factor may be adopted. Defining a value in the midstream of averaging as Savg(0+kΔ, n), the forgetting factor as α, and the initial value of Savg(0+kΔ,0) as 0 and repeating calculation as n=0, 1, . . . , N, a conclusive average value Savg(0+kΔ) can be acquired as Savg(0+kΔ,N).

$$Savg(0+k\Delta,n)=(1-2\alpha)\cdot Savg(0+k\Delta,n-1)+\alpha\cdot S(0+k\Delta+n\cdot\delta)+\alpha\cdot S(0+k\Delta-n\cdot\delta) \quad \text{[Expression 4]}$$

As a method of selecting an optimum value of the dispersion compensation amount, a k which maximizes the average value Savg(0+kΔ) of the clock detection value may be searched to be the optimum k.

Industrial Applicability

As described above, according to the present invention, an optimum dispersion compensation amount can be detected efficiently by applying minute variation to a compensation amount of the wavelength dispersion compensation circuit of an optical communication system and halving the applying variation amount for every trial number at the time of searching the optimum compensation amount with the clock detection signal as the monitoring signal.

REFERENCE SIGNS LIST

11 Analog-digital convertor
12 Digital signal processor
13 Symbol clock extractor
15 Optical fiber
101 Wavelength dispersion compensation circuit
300 Receiving device

What is claimed is:

1. A wavelength dispersion amount estimation method to estimate a dispersion compensation amount for compensating waveform distortion due to wavelength dispersion at an optical fiber transmission path, comprising:

an initial value setting step to set a dispersion compensation amount $D(0)$ which is an initial value (k=0) of a kth dispersion compensation amount $D(k)$ (k is an integer);

a clock detecting step to detect and store strength of a symbol arrival timing clock included in received data at the dispersion compensation amount $D(k)$ as a clock detection value $S(k)$;

a plus side shifting step to detect and store strength of the symbol arrival timing clock at a dispersion compensation amount $D(k)+\Delta D$ which is obtained by shifting the dispersion compensation amount $D(k)$ to a plus side by a specific amount $\Delta D$ as a clock detection value $S(k+)$;

a minus side shifting step to detect and store strength of the symbol arrival timing clock at a dispersion compensation amount $D(k)-\Delta D$ which is obtained by shifting the dispersion compensation amount $D(k)$ to a minus side by the specific amount $\Delta D$ as a clock detection value $S(k-)$;

a comparing step to compare the clock detection value $S(k)$, the clock detection value $S(k+)$, and the clock detection value $S(k-)$; and an evaluating step to determine to complete estimation of the dispersion compensation amount as determining the dispersion compensation amount $D(k)$ as an optimum dispersion compensation amount when the clock detection value $S(k)$ is the largest, and to perform the clock detecting step, the plus side shifting step, the minus side shifting step, and the comparing step once again with the dispersion compensation amount of the largest clock detection value set as a k+1th dispersion compensation amount $D(k+1)$ when the clock detection value $S(k+)$ or the clock detection value $S(k-)$ is the largest, as a result of the comparing step.

2. The wavelength dispersion amount estimation method according to claim 1, further comprising an approximate dispersion compensation amount acquiring step in which an approximate value of the dispersion compensation amount is acquired before the initial value setting step and the approximate value of the dispersion compensation amount is set as the dispersion compensation amount $D(0)$ in the initial value setting step.

3. The wavelength dispersion amount estimation method according to claim 2, wherein an acceptable repeating number K (K is a natural number) is set and estimation of the dispersion compensation amount is completed when k=K through comparison of k and K in the evaluating step.

4. The wavelength dispersion amount estimation method according to claim 3, wherein the specific amount $\Delta D$ for shifting the dispersion compensation amount in the plus side shifting step and the minus side shifting step is an amount dividing dispersion proof strength capable of detecting the symbol arrival timing clock by the acceptable repeating number K.

5. The wavelength dispersion amount estimation method according to claim 2, wherein a minute amount $\delta D$ which is smaller than the specific amount $\Delta D$ for shifting the dispersion compensation amount in the plus side shifting step and the minus side shifting step is set, a clock detection value $S(k\pm 0)$ at the dispersion compensation amount $D(k)$ and clock detection values $S(k\pm n\delta)$ at dispersion compensation amounts $D(k)\pm n\delta D$ (n is a natural number) whose the dispersion compensation amount $D(k)$ is the center value are detected and the clock detection value $S(k)$ is obtained by averaging the clock detection value $S(k\pm 0)$ and the clock detection values $S(k\pm n\delta D)$ in the clock detecting step, a clock detection value $S(k\pm 0+)$ at the dispersion compensation amount $D(k)+\Delta D$ and clock detection values $S(k\pm n\delta+)$ at dispersion compensation amounts $D(k)+\Delta D\pm n\delta D$ (n is a natural number) whose the dispersion compensation amount $D(k)+\Delta D$ is the center value are detected and the clock detection value $S(k+)$ is obtained by averaging the clock detection value $S(k\pm 0+)$ and the clock detection values $S(k\pm n\delta D+)$ in the plus side shifting step, and a clock detection value $S(k\pm 0-)$ at the dispersion compensation amount $D(k)-\Delta D$ and clock detection values $S(k\pm n\delta-)$ at dispersion compensation amounts $D(k)-\Delta D\pm n\delta D$ (n is a natural number) whose the dispersion compensation amount $D(k)-\Delta D$ is the center value are detected and the clock detection value $S(k-)$ is obtained by averaging the clock detection value $S(k\pm 0-)$ and the clock detection values $S(k\pm n\delta-)$ in the minus side shifting step.

6. The wavelength dispersion amount estimation method according to claim 2, wherein at least one of the clock detecting step, the plus side shifting step, and the minus side shifting step is repeated several times at a specific time interval.

7. The wavelength dispersion amount estimation method according to claim 2, wherein estimation of the dispersion compensation amount is completed while the dispersion compensation amount $D(k)$ is determined as an optimum dispersion compensation amount when a difference between the clock detection value $S(k)$ and the clock detection value $S(k+)$ and a difference between the clock detection value $S(k)$ and the clock detection value $S(k-)$ are smaller than a predetermined threshold value in the evaluating step.

8. The wavelength dispersion amount estimation method according to claim 1, wherein an acceptable repeating number K (K is a natural number) is set and estimation of the dispersion compensation amount is completed when k=K through comparison of k and K in the evaluating step.

9. The wavelength dispersion amount estimation method according to claim 8, wherein the specific amount $\Delta D$ for shifting the dispersion compensation amount in the plus side shifting step and the minus side shifting step is an amount dividing dispersion proof strength capable of detecting the symbol arrival timing clock by the acceptable repeating number K.

10. The wavelength dispersion amount estimation method according to claim 1, wherein a minute amount $\delta D$ which is smaller than the specific amount $\Delta D$ for shifting the dispersion compensation amount in the plus side shifting step and the minus side shifting step is set, a clock detection value $S(k\pm 0)$ at the dispersion compensation amount $D(k)$ and clock detection values $S(k\pm n\delta)$ at dispersion compensation amounts $D(k)\pm n\delta D$ (n is a natural number) whose the dispersion compensation amount $D(k)$ is the center value are detected and the clock detection value $S(k)$ is obtained by averaging the clock detection value $S(k\pm 0)$ and the clock detection values $S(k\pm n\delta D)$ in the clock detecting step, a clock detection value S(k±0+) at the dispersion compensation amount D(k)+ΔD and clock detection values S(k±nδ+) at dispersion compensation amounts D(k)+ΔD±nδD (n is a natural number) whose the dispersion compensation amount D(k)+ΔD is the center value are detected and the clock detection value S(k+) is obtained by averaging the clock detection value S(k±0+) and the clock detection values S(k±nδD+) in the plus side shifting step, and a clock detection value S(k±0−) at the dispersion compensation amount D(k)−ΔD and clock detection values S(k±nδ−) at dispersion compensation amounts D(k)−ΔD±nδD (n is a natural number) whose the dispersion compensation amount D(k)−ΔD is the center value are detected and the clock detection value S(k−) is obtained by averaging the clock detection value S(k±0−) and the clock detection values S(k±nδ−) in the minus side shifting step.

11. The wavelength dispersion amount estimation method according to claim 1, wherein at least one of the clock detecting step, the plus side shifting step, and the minus side shifting step is repeated several times at a specific time interval.

12. The wavelength dispersion amount estimation method according to claim 1, wherein estimation of the dispersion compensation amount is completed while the dispersion compensation amount D(k) is determined as an optimum dispersion compensation amount when a difference between the clock detection value S(k) and the clock detection value S(k+) and a difference between the clock detection value S(k) and the clock detection value S(k−) are smaller than a predetermined threshold value in the evaluating step.

13. The wavelength dispersion amount estimation method according to claim 1, wherein when a dispersion compensation amount D(k+1) is shifted to the plus side of a dispersion compensation amount D(k), the plus side shifting step is performed without performing the minus side shifting, step after the clock detecting step, and the clock detection value S(k) and the clock detection value S(k+) are compared in the comparing step, and when a dispersion compensation amount D(k+1) is shifted to the minus side of a dispersion compensation amount D(k), the minus side shifting step is performed without performing the plus side shifting step after the clock detecting step, and the clock detection value S(k) and the clock detection value S(k−) are compared in the comparing step.

14. A wavelength dispersion compensation circuit, comprising:

an analog-digital convertor which converts optical analog waveform received from the optical fiber transmission path into a digital signal;

a digital signal processor which compensates waveform distortion due to wavelength dispersion at the optical fiber transmission path of the digital signal output from the analog-digital convertor with the dispersion compensation amount estimated with a wavelength dispersion amount estimation method to estimate a dispersion compensation amount for compensating waveform distortion due to wavelength dispersion at an optical fiber transmission path; and a symbol clock extractor which extracts a symbol arrival timing clock of received data included in the digital signal output from the analog-digital convertor and outputs strength of the symbol arrival timing clock as the clock detection value, the wavelength dispersion amount estimation method is comprising:

an initial value setting step to set a dispersion compensation amount D(0) which is an initial value (k=0) of a kth dispersion compensation amount D(k) (k is an integer);

a clock detecting step to detect and store strength of a symbol arrival timing clock included in received data at the dispersion compensation amount D(k) as a clock detection value S(k);

a plus side shifting step to detect and store strength of the symbol arrival timing clock at a dispersion compensation amount D(k)+ΔD which is obtained by shifting the dispersion compensation amount D(k) to a plus side by a specific amount ΔD as a clock detection value S(k+);

a minus side shifting step to detect and store strength of the symbol arrival timing clock at a dispersion compensation amount D(k)−ΔD which is obtained by shifting the dispersion compensation amount D(k) to a minus side by the specific amount ΔD as a clock detection value S(k−);

a comparing step to compare the clock detection value S(k), the clock detection value S(k+), and the clock detection value S(k−); and an evaluating step to determine to complete estimation of the dispersion Compensation amount as determining the dispersion compensation amount D(k) as an optimum dispersion compensation amount when the clock detection value S(k) is the largest, and to perform the clock detecting step, the plus side shifting step, the minus side shifting step, and the comparing step once again with the dispersion compensation amount of the largest clock detection value set as a k+1th dispersion compensation amount D(k+1) when the clock detection value S(k+) or the clock detection value S(k−) is the largest, as a result of the comparing step.

15. The wavelength dispersion compensation circuit according to claim 14, further comprising an approximate dispersion compensation amount acquiring step in which an approximate value of the dispersion compensation amount is acquired before the initial value setting step and the approximate value of the dispersion compensation amount is set as the dispersion compensation amount D(0) in the initial value setting step.

16. The wavelength dispersion compensation circuit according to claim 15, wherein an acceptable repeating number K (K is a natural number) is set and estimation of the dispersion compensation amount is completed when k=K through comparison of k and K in the evaluating step.

17. The wavelength dispersion compensation circuit according to claim 16, wherein the specific amount ΔD for shifting the dispersion compensation amount in the plus side shifting step and the minus side shifting step is an amount dividing dispersion proof strength capable of detecting the symbol arrival timing clock by the acceptable repeating number K.

18. The wavelength dispersion compensation circuit according to claim 15,
  wherein a minute amount δD which is smaller than the specific amount ΔD for shifting the dispersion compensation amount in the plus side shifting step and the minus side shifting step is set,
  a clock detection value S(k±0) at the dispersion compensation amount D(k) and clock detection values S(k±nδ) at dispersion compensation amounts D(k)±nδD (n is a natural number) whose the dispersion compensation amount D(k) is the center value are detected and the clock detection value S(k) is obtained by averaging the clock detection value S(k±0) and the clock detection values S(k±nδD) in the clock detecting step,
  a clock detection value S(k±0+) at the dispersion compensation amount D(k)+ΔD and clock detection values S(k±nδ+) at dispersion compensation amounts D(k)+ΔD±nδD (n is a natural number) whose the dispersion compensation amount D(k)+ΔD is the center value are detected and the clock detection value S(k+) is obtained by averaging the clock detection value S(k±0+) and the clock detection values S(k±nδD+) in the plus side shifting step, and
  a clock detection value S(k±0−) at the dispersion compensation amount D(k)−ΔD and clock detection values S(k±nδ−) at dispersion compensation amounts D(k)−ΔD±nδD (n is a natural number) whose the dispersion compensation amount D(k)−ΔD is the center value are detected and the clock detection value S(k−) is obtained by averaging the clock detection value S(k±0−) and the clock detection values S(k±nδ−) in the minus side shifting step.

19. The wavelength dispersion compensation circuit according to claim 15,
  wherein at least one of the clock detecting step, the plus side shifting step, and the minus side shifting step is repeated several times at a specific time interval.

20. The wavelength dispersion compensation circuit according to claim 15,
  wherein estimation of the dispersion compensation amount is completed while the dispersion compensation amount D(k) is determined as an optimum dispersion compensation amount when a difference between the clock detection value S(k) and the clock detection value S(k+) and a difference between the clock detection value S(k) and the clock detection value S(k−) are smaller than a predetermined threshold value in the evaluating step.

21. The wavelength dispersion compensation circuit according to claim 14,
  wherein an acceptable repeating number K (K is a natural number) is set and
  estimation of the dispersion compensation amount is completed when k=K through comparison of k and K in the evaluating step.

22. The wavelength dispersion compensation circuit according to claim 21,
  wherein the specific amount ΔD for shifting the dispersion compensation amount in the plus side shifting step and the minus side shifting step is an amount dividing dispersion proof strength capable of detecting the symbol arrival timing clock by the acceptable repeating number K.

23. The wavelength dispersion compensation circuit according to claim 14,
  wherein a minute amount δD which is smaller than the specific amount ΔD for shifting the dispersion compensation amount in the plus side shifting step and the minus side shifting step is set,
  a clock detection value S(k±0) at the dispersion compensation amount D(k) and clock detection values S(k±nδ) at dispersion compensation amounts D(k)±nδD (n is a natural number) whose the dispersion compensation amount D(k) is the center value are detected and the clock detection value S(k) is obtained by averaging the clock detection value S(k±0) and the clock detection values S(k±nδD) in the clock detecting step,
  a clock detection value S(k±0+) at the dispersion compensation amount D(k)+ΔD and clock detection values S(k±nδ+) at dispersion compensation amounts D(k)+ΔD±nδD (n is a natural number) whose the dispersion compensation amount D(k)+ΔD is the center value are detected and the clock detection value S(k+) is obtained by averaging the clock detection value S(k±0+) and the clock detection values S(k±nδD+) in the plus side shifting step, and
  a clock detection value S(k±0−) at the dispersion compensation amount D(k)−ΔD and clock detection values S(k±nδ−) at dispersion compensation amounts D(k)−ΔD±nδD (n is a natural number) whose the dispersion compensation amount D(k)−ΔD is the center value are detected and the clock detection value S(k−) is obtained by averaging the clock detection value S(k±0−) and the clock detection values S(k±nδ−) in the minus side shifting step.

24. The wavelength dispersion compensation circuit according to claim 14,
  wherein at least one of the clock detecting step, the plus side shifting step, and the minus side shifting step is repeated several times at a specific time interval.

25. The wavelength dispersion compensation circuit according to claim 14,
  wherein estimation of the dispersion compensation amount is completed while the dispersion compensation amount D(k) is determined as an optimum dispersion compensation amount when a difference between the clock detection value S(k) and the clock detection value S(k+) and a difference between the clock detection value S(k) and the clock detection value S(k−) are smaller than a predetermined threshold value in the evaluating step.

26. The wavelength dispersion compensation circuit according to claim 14,
  wherein when a dispersion compensation amount D(k+1) is shifted to the plus side of a dispersion compensation amount D(k), the plus side shifting step is performed without performing, the minus side shifting step after the clock detecting step, and the clock detection value S(k) and the clock detection value S(k+) are compared in the comparing step, and
  when a dispersion compensation amount D(k+1) is shifted to the minus side of a dispersion compensation amount D(k), the minus side shifting step is performed without performing the plus side shifting step after the clock detecting step, and the clock detection value S(k) and the clock detection value S(k−) are compared in the comparing step.

27. A receiving device, comprising the wavelength dispersion compensation circuit which is comprising:

an analog-digital convertor which converts optical analog waveform received from the optical fiber transmission path into a digital signal;

a digital signal processor which compensates waveform distortion due to wavelength dispersion at the optical fiber transmission path of the digital signal output from the analog-digital convertor with the dispersion compensation amount estimated with a wavelength dispersion amount estimation method to estimate a dispersion compensation amount for compensating waveform distortion due to wavelength dispersion at an optical fiber transmission path; and a symbol clock extractor which extracts a symbol arrival timing clock of received data included in the digital signal output from the analog-digital convertor and outputs strength of the symbol arrival timing clock as the clock detection value, the wavelength dispersion amount estimation method is comprising:

an initial value setting step to set a dispersion compensation amount $D(0)$ which is an initial value ($k=0$) of a kth dispersion compensation amount $D(k)$ ($k$ is an integer);

a clock detecting step to detect and store strength of a symbol arrival timing clock included in received data at the dispersion compensation amount $D(k)$ as a clock detection value $S(k)$;

a plus side shifting step to detect and store strength of the symbol arrival timing clock at a dispersion compensation amount $D(k)+\Delta D$ which is obtained by shifting the dispersion compensation amount $D(k)$ to a plus side by a specific amount $\Delta D$ as a clock detection value $S(k+)$;

a minus side shifting step to detect and store strength of the symbol arrival timing clock at a dispersion compensation amount $D(k)-\Delta D$ which is obtained by shifting the dispersion compensation amount $D(k)$ to a minus side by the specific amount $\Delta D$ as a clock detection value $S(k-)$;

a comparing step to compare the clock detection value $S(k)$, the clock detection value $S(k+)$, and the clock detection value $S(k-)$; and an evaluating step to determine to complete estimation of the dispersion compensation amount as determining the dispersion compensation amount $D(k)$ as an optimum dispersion compensation amount when the clock detection value $S(k)$ is the largest, and to perform the clock detecting step, the plus side shifting step, the minus side shifting step, and the comparing step once again with the dispersion compensation amount of the largest clock detection value set as a k+1th dispersion compensation amount $D(k+1)$ when the clock detection value $S(k+)$ or the clock detection value $S(k-)$ is the largest, as a result of the comparing step.

28. The receiving device according to claim 27, further comprising an approximate dispersion compensation amount acquiring step in which an approximate value of the dispersion compensation amount is acquired before the initial value setting step and the approximate value of the dispersion compensation amount is set as the dispersion compensation amount $D(0)$ in the initial value setting step.

29. The receiving device according to claim 28,
wherein an acceptable repeating number K (K is a natural number) is set and estimation of the dispersion compensation amount is completed when $k=K$ through comparison of $k$ and $K$ in the evaluating step.

30. The receiving device according to claim 29,
wherein the specific amount $\Delta D$ for shifting the dispersion compensation amount in the plus side shifting step and the minus side shifting step is an amount dividing dispersion proof strength capable of detecting the symbol arrival timing clock by the acceptable repeating number K.

31. The receiving device according to claim 28,
wherein a minute amount $\delta D$ which is smaller than the specific amount $\Delta D$ for shifting the dispersion compensation amount in the plus side shifting step and the minus side shifting step is set, a clock detection value $S(k\pm0)$ at the dispersion compensation amount $D(k)$ and clock detection values $S(k\pm n\delta)$ at dispersion compensation amounts $D(k)\pm n\delta D$ (n is a natural number) whose the dispersion compensation amount $D(k)$ is the center value are detected and the clock detection value $S(k)$ is obtained by averaging the clock detection value $S(k\pm0)$ and the clock detection values $S(k\pm n\delta D)$ in the clock detecting step, a clock detection value $S(k\pm0+)$ at the dispersion compensation amount $D(k)+\Delta D$ and clock detection values $S(k\pm n\delta+)$ at dispersion compensation amounts $D(k)+\Delta D\pm n\delta D$ (n is a natural number) whose the dispersion compensation amount $D(k)+\Delta D$ is the center value are detected and the clock detection value $S(k+)$ is obtained by averaging the clock detection value $S(k\pm0+)$ and the clock detection values $S(k\pm n\delta D+)$ in the plus side shifting step, and a clock detection value $S(k\pm0-)$ at the dispersion compensation amount $D(k)-\Delta D$ and clock detection values $S(k\pm n\delta-)$ at dispersion compensation amounts $D(k)-\Delta D\pm n\delta D$ (n is a natural number) whose the dispersion compensation amount $D(k)-\Delta D$ is the center value are detected and the clock detection value $S(k-)$ is obtained by averaging the clock detection value $S(k\pm0-)$ and the clock detection values $S(k\pm n\delta-)$ in the minus side shifting step.

32. The receiving device according to claim 28,
wherein at least one of the clock detecting step, the plus side shifting step, and the minus side shifting step is repeated several times at a specific time interval.

33. The receiving device according to claim 28,
wherein estimation of the dispersion compensation amount is completed while the dispersion compensation amount $D(k)$ is determined as an optimum dispersion compensation amount when a difference between the clock detection value $S(k)$ and the clock detection value $S(k+)$ and a difference between the clock detection value $S(k)$ and the clock detection value $S(k-)$ are smaller than a predetermined threshold value in the evaluating step.

34. The receiving device according to claim 27,
wherein an acceptable repeating number K (K is a natural number) is set and estimation of the dispersion compensation amount is completed when $k=K$ through comparison of $k$ and $K$ in the evaluating step.

35. The receiving device according to claim 34,
wherein the specific amount $\Delta D$ for shifting the dispersion compensation amount in the plus side shifting step and the minus side shifting step is an amount dividing dispersion proof strength capable of detecting the symbol arrival timing clock by the acceptable repeating number K.

36. The receiving device according to claim 27,
wherein a minute amount δD which is smaller than the specific amount ΔD for shifting the dispersion compensation amount in the plus side shifting step and the minus side shifting step is set,
a clock detection value S(k±0) at the dispersion compensation amount D(k) and clock detection values S(k±nδ) at dispersion compensation amounts D(k)±nδD (n is a natural number) whose the dispersion compensation amount D(k) is the center value are detected and the clock detection value S(k) is obtained by averaging the clock detection value S(k±0) and the clock detection values S(k±nδD) in the clock detecting step,
a clock detection value S(k±0+) at the dispersion compensation amount D(k)+ΔD and clock detection values S(k±nδ+) at dispersion compensation amounts D(k)+ΔD±nδD (n is a natural number) whose the dispersion compensation amount D(k)+ΔD is the center value are detected and the clock detection value S(k+) is obtained by averaging the clock detection value S(k±0+) and the clock detection values S(k±nδD+) in the plus side shifting step, and
a clock detection value S(k±0−) at the dispersion compensation amount D(k)−ΔD and clock detection values S(k±nδ−) at dispersion compensation amounts D(k)−ΔD±nδD (n is a natural number) whose the dispersion compensation amount D(k)−ΔD is the center value are detected and the clock detection value S(k−) is obtained by averaging the clock detection value S(k±0−) and the clock detection values S(k±nδ−) in the minus side shifting step.

37. The receiving device according to claim 27,
wherein at least one of the clock detecting step, the plus side shifting step, and the minus side shifting step is repeated several times at a specific time interval.

38. The receiving device according to claim 27,
wherein estimation of the dispersion compensation amount is completed while the dispersion compensation amount D(k) is determined as an optimum dispersion compensation amount when a difference between the clock detection value S(k) and the clock detection value S(k+) and a difference between the clock detection value S(k) and the clock detection value S(k−) are smaller than a predetermined threshold value in the evaluating step.

39. The receiving device according to claim 27,
wherein when a dispersion compensation amount D(k+1) is shifted to the plus side of a dispersion compensation amount D(k), the plus side shifting step is performed without performing the minus side shifting step after the clock detecting step, and the clock detection value S(k) and the clock detection value S(k+) are compared in the comparing step, and
when a dispersion compensation amount D(k+1) is shifted to the minus side of a dispersion compensation amount D(k), the minus side shifting step is performed without performing the plus side shifting step after the clock detecting step, and the clock detection value S(k) and the clock detection value S(k−) are compared in the comparing step.

* * * * *